US011922519B2

(12) United States Patent
Stuber et al.

(10) Patent No.: US 11,922,519 B2
(45) Date of Patent: *Mar. 5, 2024

(54) AGRICULTURAL SPATIAL DATA PROCESSING SYSTEMS AND METHODS

(71) Applicant: Climate LLC, Saint Louis, MO (US)

(72) Inventors: Jakob Stuber, Tremont, IL (US); Tim Reddy, Washington, IL (US)

(73) Assignee: CLIMATE LLC, Saint Louis, MO (US)

( * ) Notice: Subject to any disclaimer, the term of this patent is extended or adjusted under 35 U.S.C. 154(b) by 185 days.

This patent is subject to a terminal disclaimer.

(21) Appl. No.: 16/687,305

(22) Filed: Nov. 18, 2019

(65) Prior Publication Data

US 2020/0082478 A1 Mar. 12, 2020

Related U.S. Application Data

(63) Continuation of application No. 15/674,938, filed on Aug. 11, 2017, now Pat. No. 10,482,547, which is a (Continued)

(51) Int. Cl.
*G06Q 50/02* (2012.01)

(52) U.S. Cl.
CPC .................................... *G06Q 50/02* (2013.01)

(58) Field of Classification Search
CPC .............................. G06Q 50/02; G06F 16/487
(Continued)

(56) References Cited

U.S. PATENT DOCUMENTS 5,343,761 A 9/1994 Myers
6,070,539 A * 6/2000 Flamme ............... A01C 21/005 111/177
(Continued)

FOREIGN PATENT DOCUMENTS

EP 855601 A1 * 7/1998 ............. G01S 7/064
WO 2012/129442 A2 9/2012
(Continued)

OTHER PUBLICATIONS

U.S. Appl. No. 14/475,431, filed Sep. 2, 2014, Interview Summary, dated Nov. 25, 2016.
(Continued)

*Primary Examiner* — Allen S Lin
(74) *Attorney, Agent, or Firm* — Harness, Dickey & Pierce, P.L.C.

(57) ABSTRACT

A method comprising while traversing, by a current agricultural implement during a current agricultural operation, a plurality of current geo-referenced locations: receiving, from one or more sensors, mounted in the current agricultural implement, current data at the plurality of current geo-referenced locations, wherein the plurality of current geo-referenced locations includes a plurality of swath locations; dynamically displaying a visual correlation between previous data collected from a previous agricultural operation and the current data, comprising: rendering a bitmap from bitmap values corresponding to the current data, wherein the bitmap includes only those bitmap values that are associated with a threshold number of swath locations; generating a plurality of values of the previous data corresponding to a current geo-referenced location of the current agricultural implement; and displaying, on a display device, the plurality of values of the previous data as visually
(Continued)

correlated with the current data received during the current agricultural operation.

8 Claims, 9 Drawing Sheets

Related U.S. Application Data continuation of application No. 14/475,431, filed on Sep. 2, 2014, now Pat. No. 9,767,521.

(60) Provisional application No. 61/872,291, filed on Aug. 30, 2013.

(58) Field of Classification Search
USPC .......................................................... 707/737
See application file for complete search history.

(56) References Cited

U.S. PATENT DOCUMENTS

| | | | | |
|---|---|---|---|---|
| 6,285,198 | B1 | 9/2001 | Nelson et al. | |
| 8,078,367 | B2 | 12/2011 | Sauder et al. | |
| 8,561,472 | B2 | 10/2013 | Sauder et al. | |
| 2006/0221077 | A1* | 10/2006 | Wright | G06F 16/248 345/428 |
| 2007/0146364 | A1* | 6/2007 | Aspen | G06T 17/05 345/426 |
| 2009/0324109 | A1* | 12/2009 | Johnston | H04N 1/648 382/232 |
| 2010/0235131 | A1 | 9/2010 | Engholm | |
| 2011/0218821 | A1 | 9/2011 | Walton | |
| 2012/0002899 | A1* | 1/2012 | Orr, IV | H04N 9/07 382/282 |
| 2012/0017163 | A1* | 1/2012 | Ragan | G06F 3/0481 715/765 |
| 2013/0044137 | A1* | 2/2013 | Forsblom | H04L 67/306 345/661 |
| 2013/0066666 | A1 | 3/2013 | Anderson | |
| 2013/0144827 | A1 | 6/2013 | Trevino | |
| 2014/0120972 | A1 | 5/2014 | Hartman | |
| 2014/0278696 | A1 | 9/2014 | Anderson | |
| 2015/0237795 | A1* | 8/2015 | Koch | A01C 21/00 701/50 |
| 2016/0077230 | A1* | 3/2016 | Vennelakanti | G01V 1/34 702/16 |
| 2017/0337642 | A1 | 11/2017 | Stuber | |

FOREIGN PATENT DOCUMENTS

| | | | |
|---|---|---|---|
| WO | 2012/149398 | A1 | 11/2012 |
| WO | 2012/149415 | A1 | 11/2012 |
| WO | 2013/023142 | A1 | 2/2013 |
| WO | 2014/026183 | A2 | 2/2014 |

OTHER PUBLICATIONS

U.S. Appl. No. 14/475,431, filed Sep. 2, 2014, Final Office Action, dated Jan. 12, 2017.
U.S. Appl. No. 14/475,431, filed Jun. 2, 2014, Office Action, dated Sep. 15, 2016.
Stuber, U.S. Appl. No. 15/674,938, filed Aug. 11, 2017, Office Action, dated Sep. 27, 2018.
Stuber, U.S. Appl. No. 15/674,938, filed Aug. 11, 2017, Notice of Allowance, dated Aug. 9, 2019.
Stuber, U.S. Appl. No. 15/674,938, filed Aug. 11, 2017, Interview Summary, dated Nov. 15, 2018.
Stuber, U.S. Appl. No. 15/674,938, filed Aug. 11, 2017, Final Office Action, dated Jan. 2, 2019.
Stuber, U.S. Appl. No. 14/475,431, filed Sep. 2, 2014, Notice of Allowance, dated May 24, 2017.
Stuber, U.S. Appl. No. 14/475,431, filed Sep. 2, 2014, Interview Summary, dated Mar. 6, 2017.

* cited by examiner

500

510

512 514 516 518

| Population (seeds/ac) | Acres | Yield (bu/ac) | Moisture (%) |
|---|---|---|---|
| 28k - 30k | 1 | 181 | 31 |
| 30k-32k | 6 | 205 | 29 |
| 32k-34k | 3 | 159 | 33 |
| Unknown | 5 | 187 | 31 |
| Totals | 15 | 188.2 | 30.6 |

520

522 524 526 528

| Hybrid | Acres | Yield (bu/ac) | Moisture (%) |
|---|---|---|---|
| A | 2 | 157 | 30 |
| B | 8 | 200 | 30.4 |
| C | 2 | 183 | 32 |
| Unknown | 3 | 181 | 31 |
| Totals | 15 | 188.2 | 30.6 |

FIG. 5

AGRICULTURAL SPATIAL DATA PROCESSING SYSTEMS AND METHODS

BENEFIT CLAIM

This application is a Continuation of prior U.S. patent application Ser. No. 15/674,938, filed Aug. 11, 2017, which is a Continuation of prior U.S. patent application Ser. No. 14/475,431, filed Sep. 2, 2014, now U.S. Pat. No. 9,767,521 issued Sep. 19, 2017, which claims the benefit of U.S. Provisional Application No. 61/872,291 filed Aug. 30, 2013, the contents of which are incorporated herein by reference for all purposes.

BACKGROUND

Precision farming practices have been implemented in recent years in order to effectively modify farming practices by location within fields in order to maximize yield and economic return. Existing mapping technology is capable of displaying various maps of agricultural application and yield data. However, there is a need in the art for systems and methods for more effectively displaying such yield data, particularly during operations in the field.

BRIEF DESCRIPTION OF THE DRAWINGS

FIG. 5 illustrates an embodiment of a monitor screen displaying a report correlating planting data and harvest data.

DESCRIPTION

Planter Data Collection System

Figure 2:
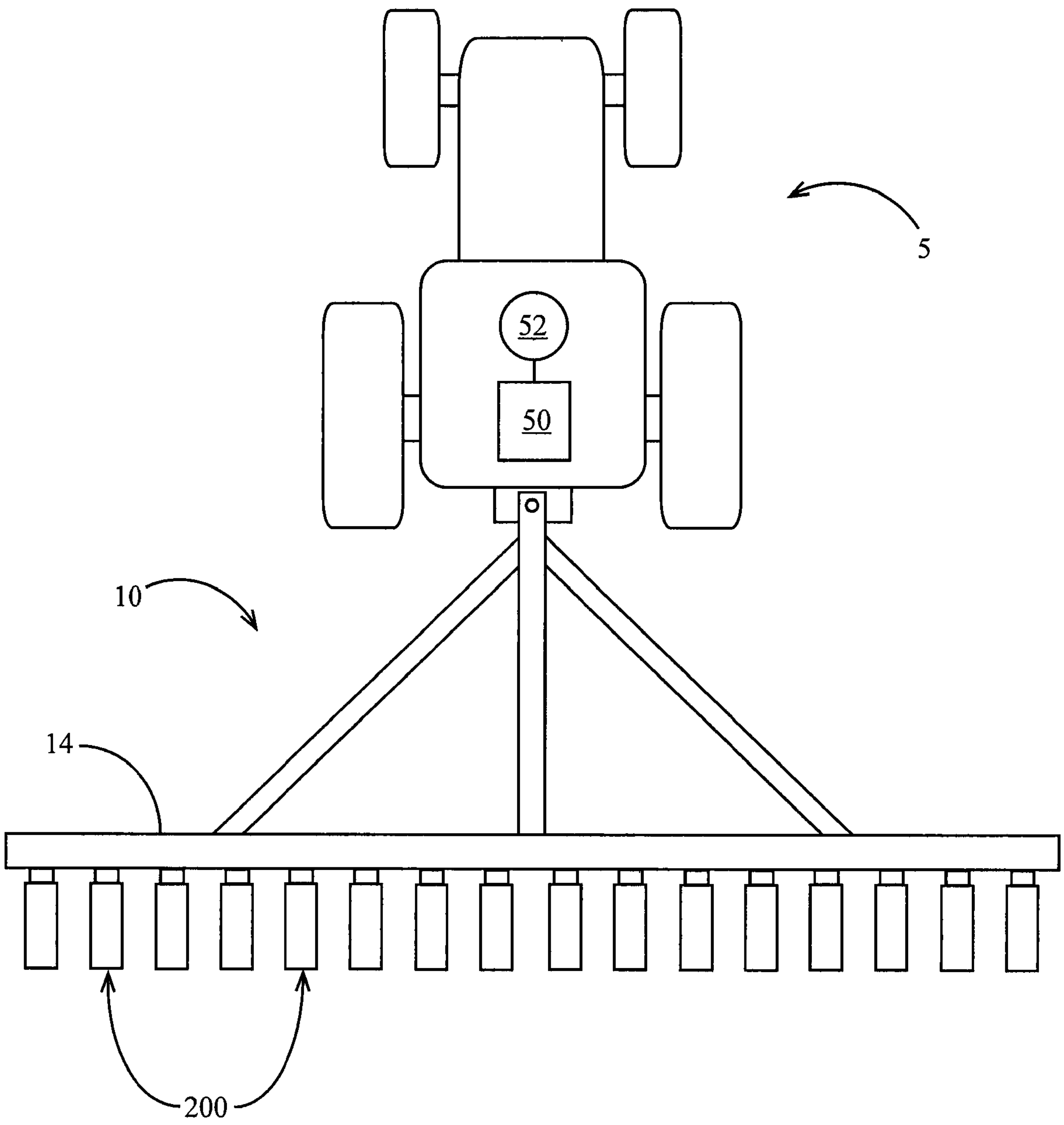
FIG. 2 is a top view of an embodiment of a planting implement drawn by a tractor.

Referring now to the drawings, wherein like reference numerals designate identical or corresponding parts throughout the several views, FIG. 2 illustrates a tractor 5 drawing an agricultural implement, e.g., a planter 10, comprising a toolbar 14 operatively supporting multiple row units 200. An implement monitor 50 preferably including a central processing unit ("CPU"), memory and graphical user interface ("GUI") (e.g., a touch-screen interface) is preferably located in the cab of the tractor 10. A global positioning system ("GPS") receiver 52 is preferably mounted to the tractor 10.

Figure 9:
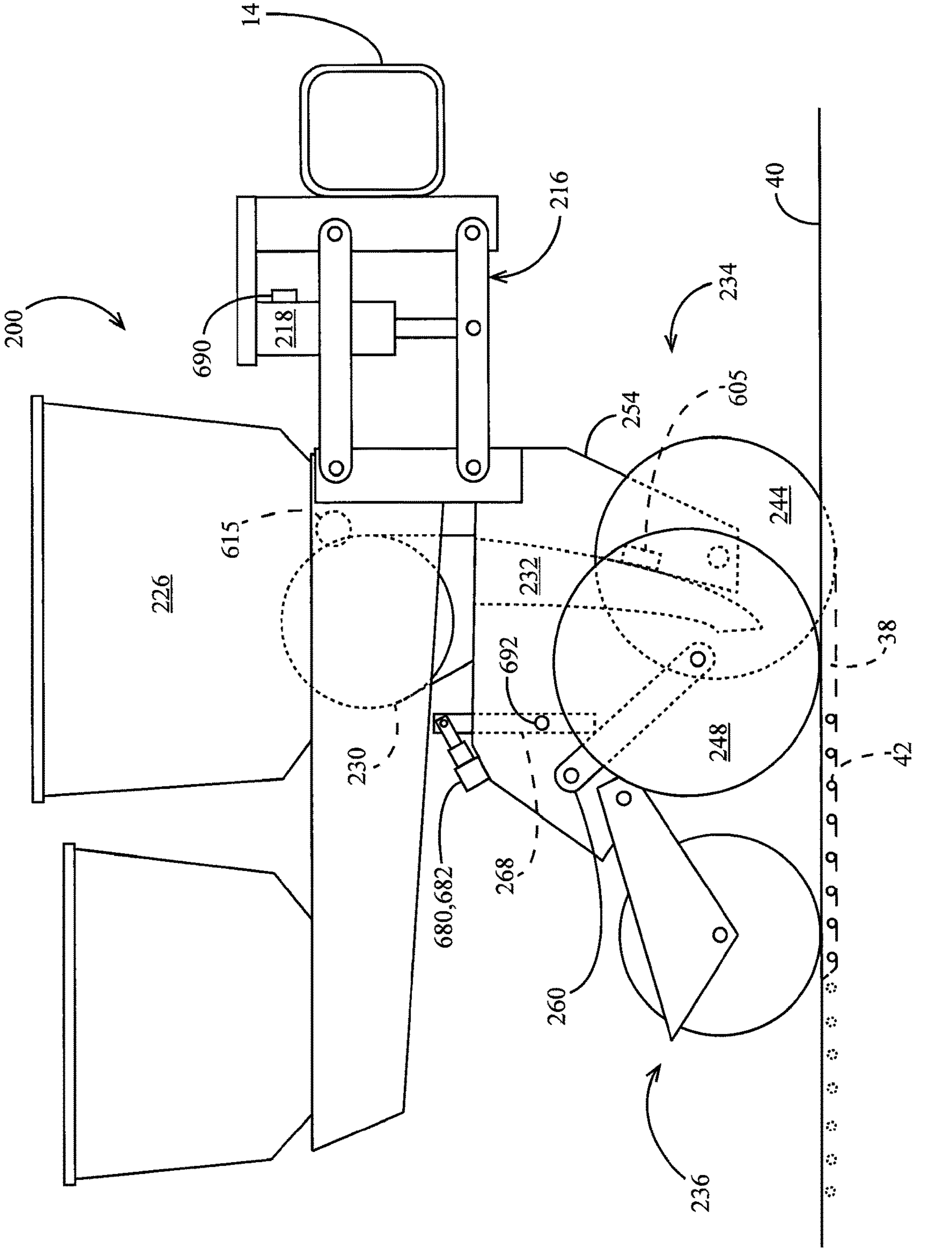
FIG. 9 illustrates an embodiment of a planter row unit.

Turning to FIG. 9, an embodiment is illustrated in which the row unit 200 is a planter row unit. The row unit 200 is preferably pivotally connected to the toolbar 14 by a parallel linkage 216. An actuator 218 is preferably disposed to apply lift and/or downforce on the row unit 200. A solenoid valve 690 is preferably in fluid communication with the actuator 218 for modifying the lift and/or downforce applied by the actuator. An opening system 234 preferably includes two opening discs 244 rollingly mounted to a downwardly-extending shank 254 and disposed to open a v-shaped trench 38 in the soil 40. A pair of gauge wheels 248 is pivotally supported by a pair of corresponding gauge wheel arms 260; the height of the gauge wheels 248 relative to the opener discs 244 sets the depth of the trench 38. A depth adjustment rocker 268 limits the upward travel of the gauge wheel arms 260 and thus the upward travel of the gauge wheels 248. A depth adjustment actuator 680 is preferably configured to modify a position of the depth adjustment rocker 268 and thus the height of the gauge wheels 248. The actuator 680 is preferably a linear actuator mounted to the row unit 200 and pivotally coupled to an upper end of the rocker 268. In some embodiments, the depth adjustment actuator 680 comprises a device such as that disclosed in International Patent Application No. PCT/US2012/035585, the disclosure of which is hereby incorporated herein by reference. An encoder 682 is preferably configured to generate a signal related to the linear extension of the actuator 680; it should be appreciated that the linear extension of the actuator 680 is related to the depth of the trench 38 when the gauge wheel arms 260 are in contact with the rocker 268. A downforce sensor 692 is preferably configured to generate a signal related to the amount of force imposed by the gauge wheels 248 on the soil 40; in some embodiments, the downforce sensor 692 comprises an instrumented pin about which the rocker 268 is pivotally coupled to the row unit 200, such as those instrumented pins disclosed in Applicant's co-pending U.S. patent application Ser. No. 12/522,253 (Pub. No. US 2010/0180695), the disclosure of which is hereby incorporated herein by reference.

Continuing to refer to FIG. 9, a seed meter 230 such as that disclosed in Applicant's co-pending International Patent Application No. PCT/US2012/030192, the disclosure of which is hereby incorporated herein by reference, is preferably disposed to deposit seeds 42 from a hopper 226 into the trench 38, e.g., through a seed tube 232 disposed to guide the seeds toward the trench. In some embodiments, the meter is powered by an electric drive 615 configured to drive a seed disc within the seed meter. In other embodiments, the drive 615 may comprise a hydraulic drive configured to drive the seed disc. A seed sensor 605 (e.g., an optical or electromagnetic seed sensor configured to generate a signal indicating passage of a seed) is preferably mounted to the seed tube 232 and disposed to send light or electromagnetic waves across the path of seeds 42. A closing system 236 including one or more closing wheels is pivotally coupled to the row unit 200 and configured to close the trench 38.

Figure 6:
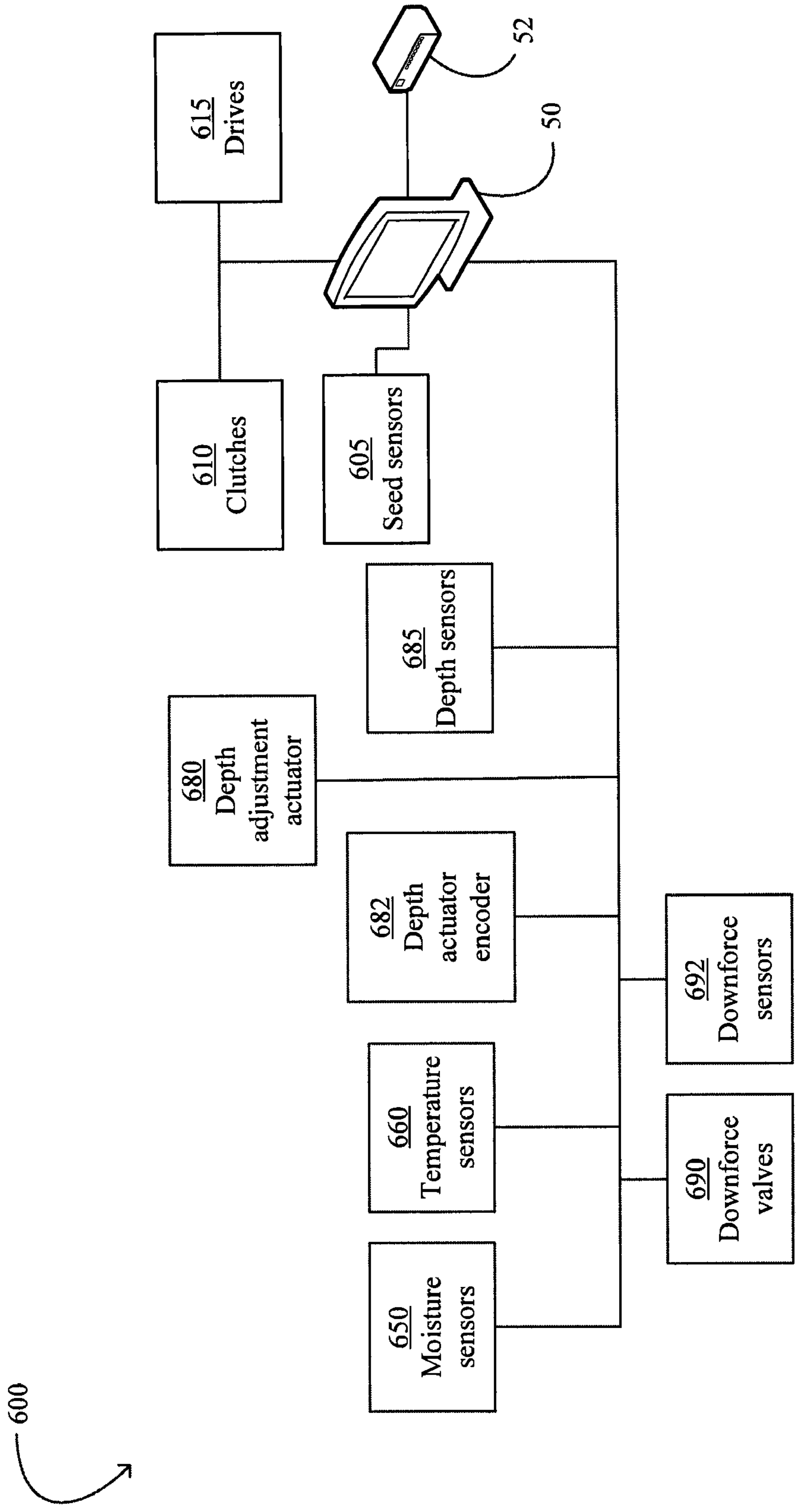
FIG. 6 illustrates an embodiment of a planter monitoring system.

Turning to FIG. 6, a planter monitoring system 600 is schematically illustrated. The monitor 50 is preferably in electrical communication with components associated with each row unit 200 including the drives 315, the seed sensors 605, the GPS receiver 52, the downforce sensors 692, the valves 690, the depth adjustment actuator 680, the depth actuator encoders 682, and the solenoid valves 690. In some embodiments, particularly those in which each seed meter 230 is not driven by an individual drive 615, the monitor 50 is also preferably in electrical communication with clutches 610 configured to selectively operably couple the seed meter 230 to a hydraulic drive or other seed meter drive.

Continuing to refer to FIG. 6, the monitor 50 is also preferably in electrical communication with one or more temperature sensors 660 such as one of the embodiments described in Applicant's U.S. Provisional Patent Application No. 61/783,591 ("the '591 application") and Applicant's International Patent Application No. PCT/US2012/035563, the disclosures of both of which are hereby incorporated herein in their entirety by reference. The monitor 50 is preferably in electrical communication with one or more moisture sensors 650 such as those disclosed in the '591 application, incorporated by reference above. In some embodiments, the monitor 50 is in electrical communication with planting depth sensors 685.

Harvest Data Collection System

Figure 7:
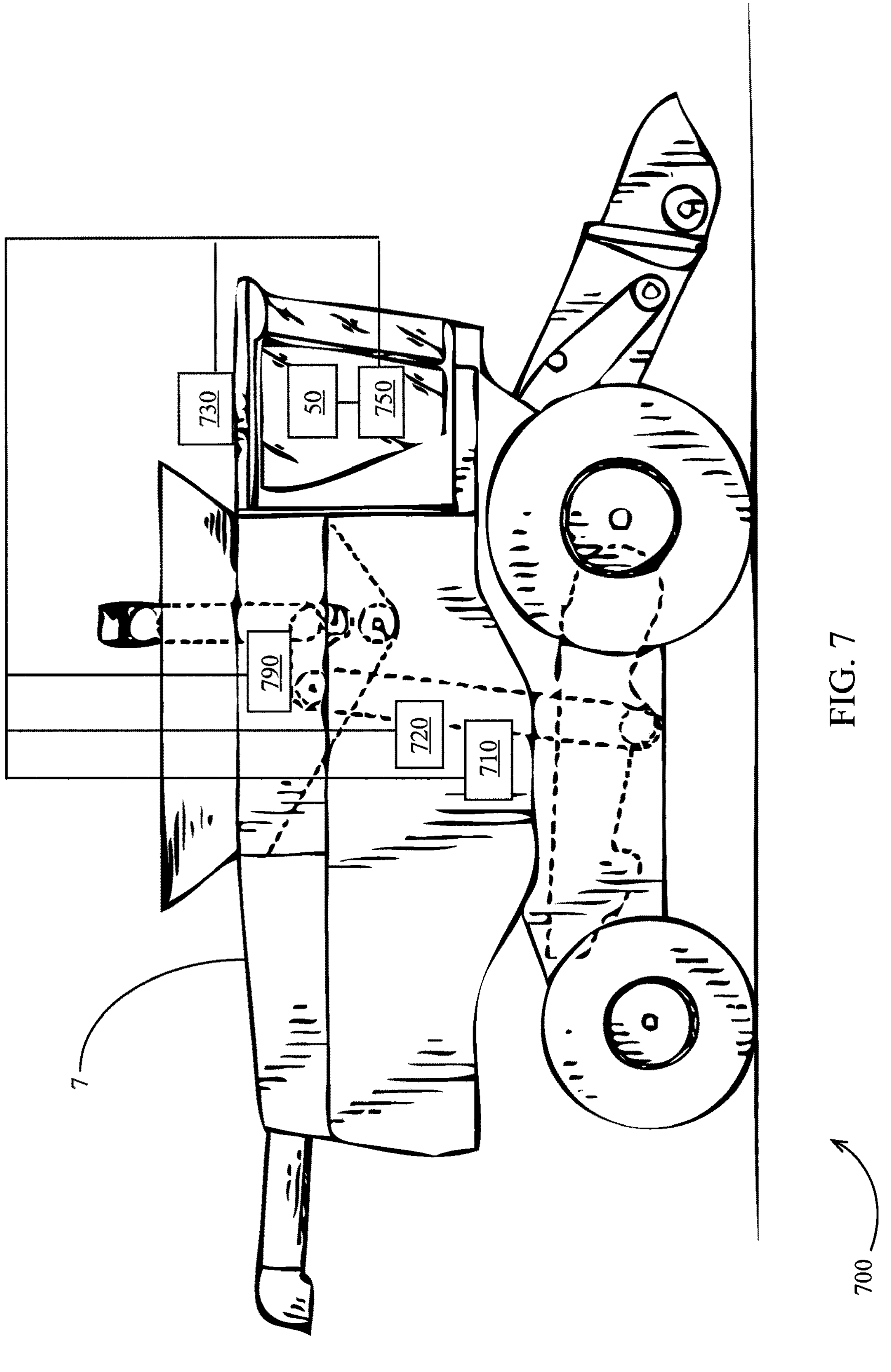
FIG. 7 illustrates an embodiment of a harvest data collection system.

A harvest data collection system 700 is illustrated in FIG. 7 schematically superimposed on a combine harvester 7, indicating preferred component mounting locations on the combine harvester. The harvest data collection system 700 preferably includes a yield sensor assembly 790. The yield sensor assembly 790 is preferably one of the embodiments disclosed in Applicant's International Patent No. PCT/US2012/050341 or U.S. Pat. No. 5,343,761, the disclosures of both of which are hereby incorporated herein in their entirety by reference. The harvest data collection system 700 preferably further includes a further a grain height sensor 710, a moisture sensor 720, a global positioning system (GPS) receiver 730, a processing board 750, and the monitor 50. The processing board 750 is preferably in data communication with the monitor 50, the yield sensor assembly 790, the grain height sensor 710, the moisture sensor 720, and the GPS receiver 730. In a preferred embodiment, the monitor 50 is the same monitor used in the planter monitor system 600. In other embodiments, a second monitor having a processor, memory and graphical user interface may be used in the harvest data collection system 700 to replace the monitor 50.

The grain height sensor 710 preferably comprises a sensor configured and disposed to measure the height of grain being lifted by the clean grain elevator. The grain height sensor 710 is preferably mounted to the sides of a clean grain elevator housing adjacent the location where grain piles are lifted vertically before reaching the top of the clean grain elevator. It should be appreciated that the grain height sensor 710 is not required for operation of the harvest data collection system 700 or the yield sensor assembly 790.

The moisture sensor 720 preferably comprises a sensor disposed to measure the moisture of grain being lifted by the clean grain elevator. For example, in some embodiments the moisture sensor 720 comprises a capacitive moisture sensor such as that disclosed in U.S. Pat. No. 6,285,198, the disclosure of which is hereby incorporated by reference herein in its entirety.

The GPS receiver 730 preferably comprises a receiver configured to receive a signal from a GPS or similar geographical referencing system. The global positioning receiver 730 is preferably mounted to the top of the combine 7.

The processing board 750 preferably comprises a central processing unit (CPU) and a memory for processing and storing signals from the system components 710, 720, 790, 730 and transmitting data to the monitor 50. The monitor 50 is preferably mounted inside a cab of the combine 7.

Monitoring Methods

Correlations

In operation, a first monitoring system (e.g., the planter monitoring system 600) preferably collects data during a first operation (e.g., a planting operation) and stores data (e.g., spatial planting data) collected during the first operation. A second monitoring system (e.g., the harvest data collection system 700) preferably collects data during a second operation (e.g., a harvesting operation) and stores data (e.g., spatial harvest data) collected during the second operation. During the second operation, the second monitoring system preferably displays visual and numerical correlations between the data collected during the first operation and the data collected during the second operation.

Figure 1:
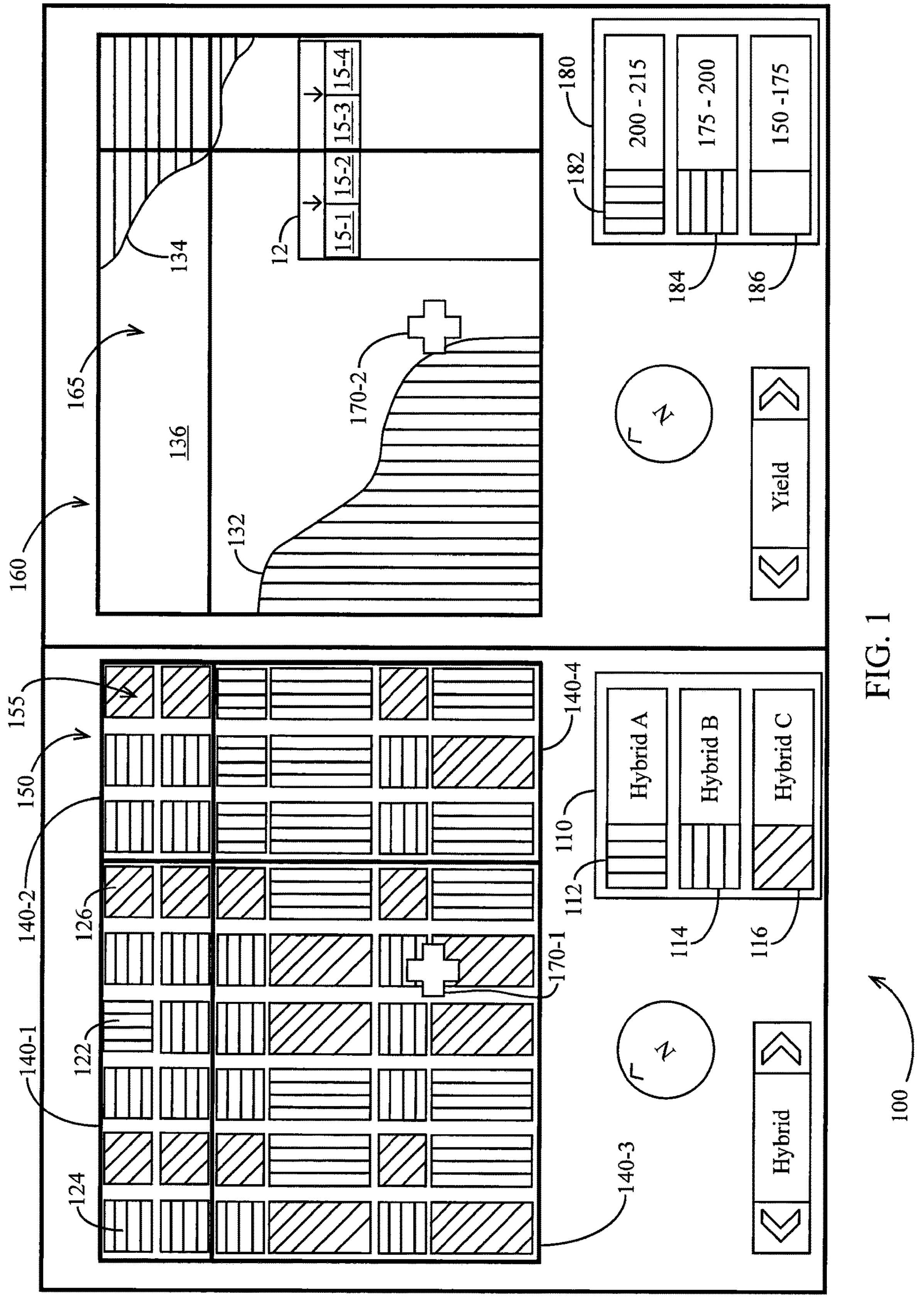
FIG. 1 illustrates an embodiment of a monitor screen displaying a live harvesting map and a prior planting map.

One such visual correlation between data collected during first and second agricultural operations is illustrated in FIG. 1. The monitor 50 is preferably configured to display a map screen 100 (similar to the map screen 1600 disclosed in International Patent Application No. PCT/US2013/054506, incorporated herein in its entirety by reference) including a completed planting map window 150 and a live yield map window 160.

The completed planting map window 150 preferably includes a map layer 155 comprising display tiles 140. Each display tile 140 preferably includes map blocks 122, 124, 126 representing live planting data (e.g., hybrid type) associated with the location of the block. The spatial extent of each display tile 140 is preferably circumscribed by a unique geo-referenced boundary (e.g., a rectangular boundary); depending on the geo-referenced area displayed by the map layer 155, only a portion of any given display tile 140 may be displayed in the map layer 155 and the map window 150. The pattern, symbol or color of each map block corresponds to a legend 110 preferably displayed in the completed planting map window 150. The legend 110 preferably includes a set of legend ranges (e.g., legend ranges 112, 114, 116) including a pattern, symbol or color and a corresponding value range. In FIG. 1, the legend ranges 112, 114, 116 correspond to population ranges. It should be appreciated that the legend ranges 112, 114, 116 correspond to map blocks 122, 124, 126, respectively. An annotation 170-1 preferably remains at the same position with respect to the map boundary as the orientation and zoom level of map window 150 are manipulated.

The live yield map window 160 preferably includes a map layer 165 comprising yield map polygons 132, 134, 136 (or blocks similar to those used in the planting maps described herein) corresponding to ranges 182, 184, 186 of a yield legend 180. As the combine traverses the field, a combine annotation 12 preferably indicates the current location of the combine within the map. Annotations 15 preferably indicate the locations of each combine row unit when using a combine having a header (e.g., a corn header) configured to harvest a crop in discrete rows. An annotation 170-2 preferably remains at the same position with respect to the map boundary as the orientation and zoom level of map window 160 are manipulated.

Figure 8:
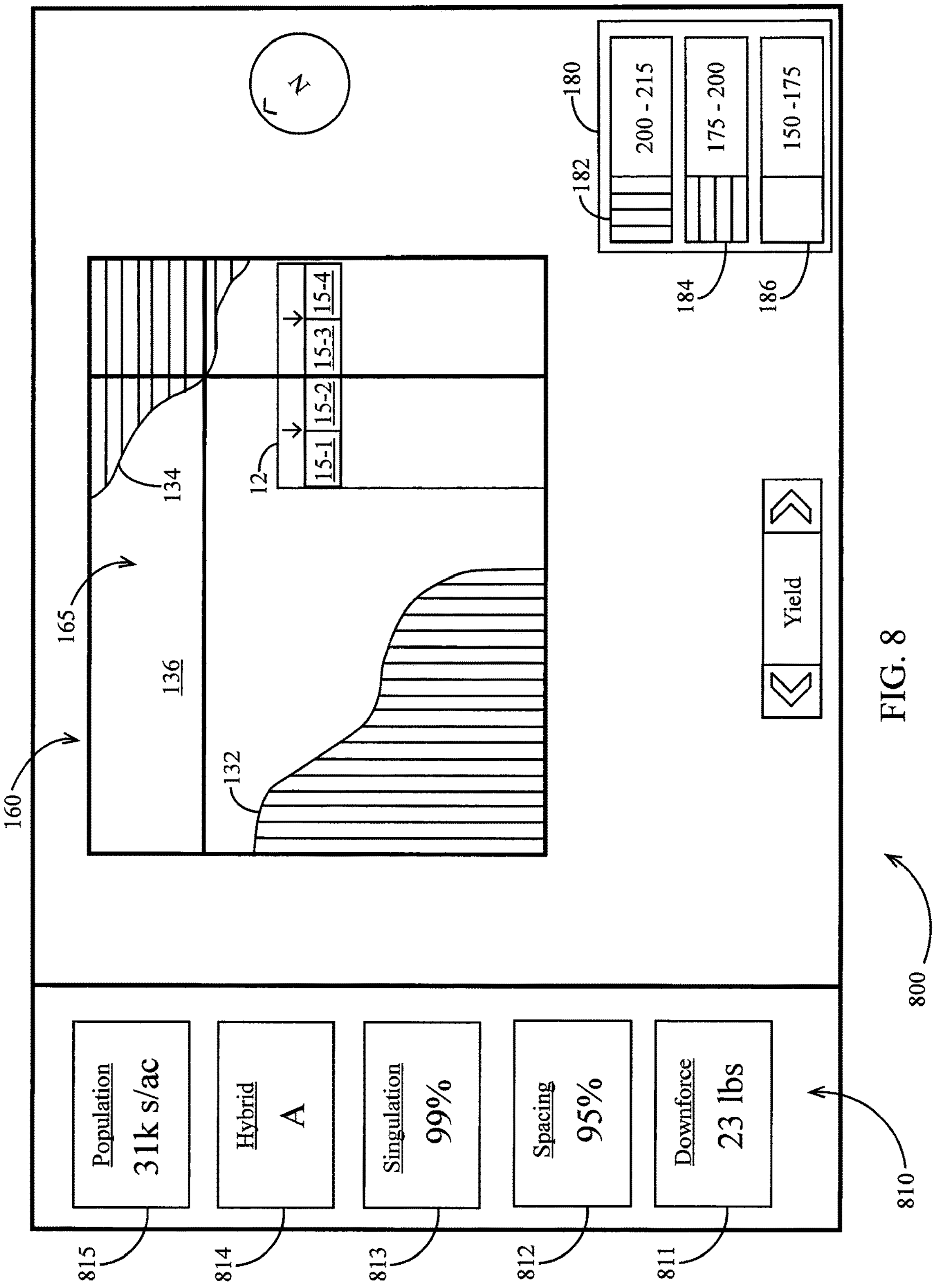
FIG. 8 illustrates another embodiment of a monitor screen displaying a live harvesting map and numerical planting metrics.

A second correlation between data collected during first and second agricultural operations is illustrated in FIG. 8. The monitor 50 is preferably configured to display a map screen 800 including live yield map window 160 (similar to that described above with respect to FIG. 1) and an array 810 of planting data windows. Each planting data window preferably displays a value of planting data corresponding to the location (the "current location") of the combine harvester 7 (indicated on the map by the annotation 12). A downforce window 811 preferably displays a downforce applied at the current location during the planting operation. A seed spacing window 812 preferably displays a seed spacing quality—preferably determined as disclosed in U.S. Pat. No. 8,078,367 ("the '367 patent"), incorporated herein by reference—of seeds planted at and/or the current location during the planting operation. A singulation window 813 preferably displays a seed singulation quality—preferably determined as disclosed in the '367 application—of seeds planted at and/or near the current location during the planting operation. A hybrid window 814 preferably identifies a variety (i.e., type) of seeds planted at and/or near the current location during the planting operation. A population window 815 preferably displays a population value—preferably determined as disclosed in the '367 application—of seeds planted at and/or near the current location during the planting operation.

A third correlation between data collected during first and second agricultural operations is illustrated in FIG. 5. The monitor 50 is preferably configured to display a correlation screen 500 including a plurality of correlation charts 510, 520. Each correlation chart 510, 520 preferably correlates data accumulated during the harvesting operation with subsets of data accumulated during the prior planting operation. Correlation chart 510 preferably contains a plurality of rows correlating population ranges 512 with acreages 514, yields 516, and moistures 518 in areas planted at each population range. Correlation chart 520 preferably contains a plurality of rows correlating hybrid types 522 with acreages 524, yields 526, and moistures 528 in areas planted with each hybrid type. The correlation charts 512, 522 are preferably repeatedly or continuously populated with data accumulated during the harvest operation such that the operator may navigate to the correlation screen 500 in order to view correlated data for all of the harvest data (e.g., acreage, yield, and moisture) accumulated thus far during the operation.

Each correlation chart preferably includes an "Unknown" row in which harvest data is accumulated for locations which could not be satisfactorily associated with harvest data; e.g., where yield was measured at a location associated with multiple populations. A common example of such multiple associations may occur when one set of combine header row units is harvesting an area planted at a first population while another set of combine header row units is harvesting an area planted at a second population. Each correlation chart preferably includes a "Totals" row in which all the harvest data is accumulated for each subset of planting data including the "Unknown" subset. In other embodiments, the correlation charts are replaced and/or supplemented with visual correlations such as bar charts or scatter plots.

In addition to population and seed hybrid, other correlation embodiments similar to those above may correlate other planting data including planting depth, planting downforce, planting temperature, and planting moisture.

Data Access and Correlation Methods

Figure 3:
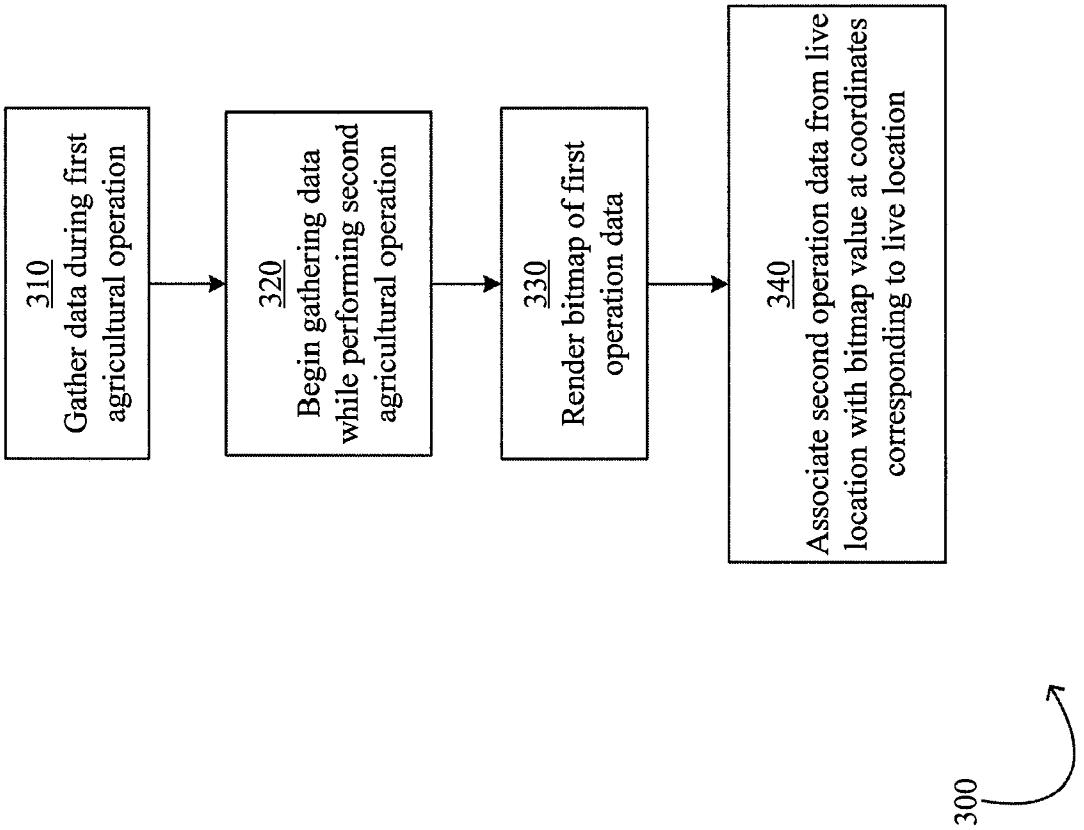
FIG. 3 illustrates an embodiment of a process for correlating data between two agricultural operations.

Referring to FIG. 3, in order to display each of the correlations described above between first and second agricultural operations, the monitor 50 is preferably configured to carry out a process 300. At step 310 the monitor 50 preferably gathers data during a first agricultural operation. At step 320 the monitor 50 preferably begins gathering data while performing a second agricultural operation. At step 330 the monitor 50 preferably renders a bitmap of the data gathered during the first operation. At step 340 the monitor 50 preferably associates the data gathered at a live location (e.g., the current location of the implement) during the second operation with a bitmap value at bitmap coordinates corresponding to the live location.

Figure 4:
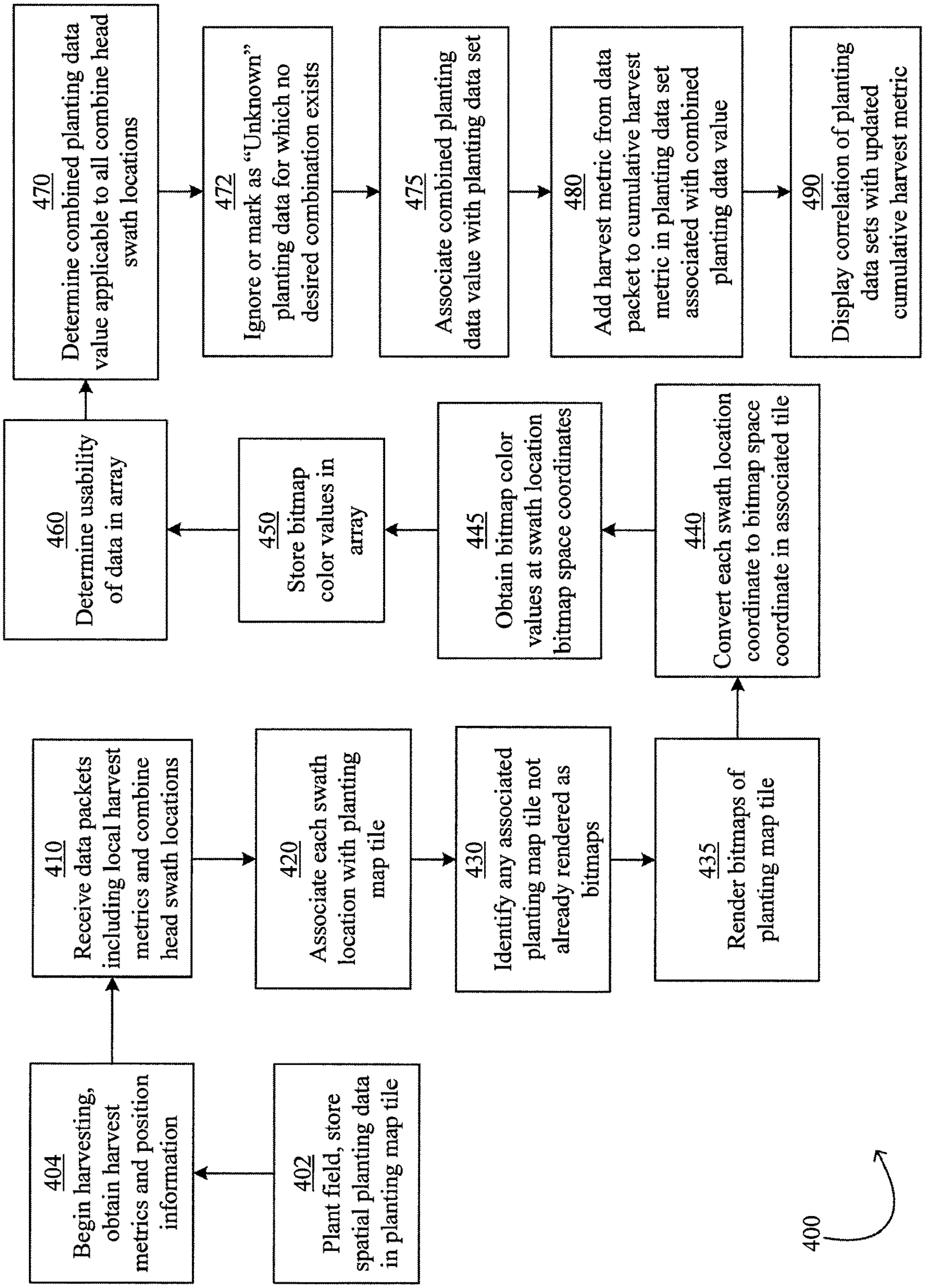
FIG. 4 illustrates another embodiment of a process for correlating data between two agricultural operations.

Turning to FIG. 4, a detailed process 400 for accessing data collected during a first (e.g., planting) operation during a second (e.g., harvesting) operation is illustrated. At step 402, an operator preferably carries out a first agricultural operation while a monitor collects spatial data. In the illustrated example the first agricultural operation comprises planting a field while the planter monitor system 600 collects the planting data described herein. At step 404, an operator preferably begins harvesting a field while the harvest data collection system 700 collects local harvest metrics and position information. At step 410, the monitor 50 preferably receives data packets at regular intervals (e.g., at 5 Hz frequency) from the sensors in the harvest data collection system 700; each data packet preferably includes harvest metrics (e.g., yield and moisture) as well as geo-referenced positions associated with the metrics. The geo-referenced positions preferably correspond to the positions of the combine header row units (referred to herein as "swath locations") at the time of (or at an offset time from) the harvest metric measurements in the packet. At step 420, the monitor 50 preferably associates each swath location with a planting map tile. Each planting map tile preferably includes multiple sets of planting data (e.g., population, singulation, downforce, depth, moisture, temperature) collected during the planting operation at a single set of coordinates, e.g., defined by a rectangular boundary as illustrated in FIG. 1. The display tiles 140 illustrated in FIG. 1 preferably comprise visual representations of one or more sets of spatial data in a map tile.

At step 430, the monitor 50 preferably identifies any map tiles that have not been rendered as a desired bitmap or bitmaps.

At step 435 the monitor 50 preferably renders the identified map tiles as a bitmap or bitmaps. In a preferred embodiment, each bitmap comprises a 256 by 256 pixel bitmap, each pixel having a value corresponding to a value or range of values in a data set within the map tile, and the coordinates of each pixel corresponding to a geo-referenced location. As a representative example, a population data set in the map tile is rendered as a population bitmap in which each range of population is assigned a unique color index. As another representative example, a hybrid (seed variety) data set in the map tile is rendered as a hybrid bitmap in which each hybrid type or index is mapped to a color index value. The generated bitmaps are preferably stored in the memory cache of the monitor 50.

At step 440, the monitor 50 preferably converts each swath location (received at step 410) to a bitmap space coordinate in the map tile with which the swath location was associated at step 420. At step 445, the monitor 50 preferably obtains bitmap color values at each swath location bitmap coordinate. At step 450 the monitor 50 preferably stores the bitmap color values in an array for each data packet received (i.e., for all the swath locations in the data packet).

At step 460, the monitor 50 preferably determines the usability of data in each array. In a preferred embodiment, the monitor 50 determines whether the percentage of swath locations successfully associated with a color value in the bitmap (e.g., the population bitmap) exceeds a threshold percentage, e.g. 90%. If the threshold is not met, the data in the array is preferably ignored or added to a "Bad" data set not used for display or correlation purposes by the monitor 50.

At step 470, the monitor 50 preferably determines a combined planting data value applicable to all the swath locations represented in the array. As an example, the population bitmap color values for each swath location are averaged such that the combined planting data value comprises an average value of all the swath locations represented in the array. As another example, the hybrid bitmap color values at each swath location are preferably used to identify a hybrid combination applicable to the entire combine head; for example, an "A" hybrid combination if each swath location was planted with seed variety A, a "B" hybrid combination if each swath location was planted with seed variety B, and an "A/B" hybrid combination if some swath locations were planted with seed variety A and others with seed variety B.

If no desired combination exists for a planting data set, then at step 472 the monitor 50 preferably ignores that planting data set or adds it to an "Unknown" data set. For example, if the hybrid data set in a given array includes a combination of hybrids not corresponding to any hybrid combination recognized by the monitor 50 (i.e., existing in a list of combinations stored in the memory of the monitor), then the hybrid data in that array is preferably ignored or added to an "Unknown" hybrid data set.

At step 475, the monitor 50 preferably associates the combined planting data value determined at step 470 with a planting data set comprising multiple ranges of planting data values. For example, in an illustrative embodiment an averaged population value of 30,010 seeds per acre is associated with a planting data set containing all population values between 30,000 seeds per acre and 30,500 seeds per acre.

At step 480, the monitor 50 preferably adds the harvest metric from the data packet to a cumulative harvest metric in the planting data set associated with the combined planting value. For example, in an illustrative embodiment a yield measurement (e.g., grain mass flow rate or bushels per acre) in a data packet having an averaged population value of 30,010 seeds per acre is added to an accumulated yield value associated with a planting data set containing all population values between 30,000 seeds per acre and 30,500 seeds per acre.

At step 490, the monitor 50 preferably displays a correlation (i.e., one of the visual or numerical correlations described above) between planting data sets (e.g., ranges of population) and cumulative harvest metrics (e.g., total harvested bushels per acre in each range of population).

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

What is claimed is:

1. A method of generating display data during a current agricultural operation, comprising:
- while traversing, by a current agricultural implement during the current agricultural operation, a plurality of current geo-referenced locations, wherein the current agricultural operation comprises a harvesting operation:
  - receiving, from one or more sensors, mounted in the current agricultural implement, current data at the plurality of current geo-referenced locations, wherein the plurality of current geo-referenced locations includes a plurality of swath locations; and
  - dynamically displaying a visual correlation between previous data collected from a previous agricultural operation and the current data, wherein the previous agricultural operation comprises a planting operation, comprising:
    - converting each of the swath locations to a bitmap space coordinate of a bitmap;
    - obtaining a color value, based on the previous data, for each of the bitmap space coordinates;
    - storing the color value for each of the bitmap space coordinates in a data array;
    - determining a percentage of the color values for the bitmap space coordinates in the data array that are the same;
    - determining whether said percentage exceeds a threshold;
    - in response to said percentage exceeding the threshold, rendering a bitmap from the bitmap space coordinates corresponding to the current data;
    - generating a plurality of values of the previous data corresponding to a current geo-referenced location of the current agricultural implement; and
    - displaying, on a display device, a plurality of windows, which includes a first window including the bitmap of the current data and a second window including the plurality of values of the previous data that is separate from the bitmap of the current data, thereby correlating the previous data with the current data received during the current agricultural operation.

2. The method of claim 1, wherein the bitmap of the current data comprises harvesting data, and the previous data comprises planting data.

3. The method of claim 2, wherein the harvesting data comprises harvest metrics and positions of combine header row units of the current agricultural implement.

4. The method of claim 1, wherein the current data is received at regular time intervals from the one or more sensors.

5. A method of generating display data during a current agricultural operation, comprising:
- while traversing, by a current agricultural implement during the current agricultural operation, a plurality of current geo-referenced locations, wherein the current agricultural operation comprises a harvesting operation:
  - receiving, from one or more sensors, mounted in the current agricultural implement, current data at the plurality of current geo-referenced locations, wherein the plurality of current geo-referenced locations includes a plurality of swath locations; and
  - dynamically displaying a visual correlation between previous data collected from a previous agricultural operation and the current data, wherein the previous agricultural operation comprises a planting operation, comprising:
    - converting each of the swath locations to a map space coordinate of a map;
    - obtaining a color value, based on the previous data, for each of the map space coordinates;
    - storing the color value for each of the map space coordinates in a data array;
    - determining a percentage of the color values for the map space coordinates in the data array that are the same;
    - determining whether said percentage exceeds a threshold
    - in response to said percentage exceeding the threshold, rendering a map from the map space coordinates corresponding to the current data;
    - generating a plurality of values of the previous data corresponding to a current geo-referenced location of the current agricultural implement; and displaying, on a display device, a plurality of windows, which includes a first window including the map of the current data and a second window including the plurality of values of the previous data that is separate from the map of the current data, thereby correlating the previous data with the current data received during the current agricultural operation.

6. The method of claim 5, wherein the map of the current data comprises harvesting data, and the previous data comprises planting data.

7. The method of claim 6, wherein the harvesting data comprises harvest metrics and positions of combine header row units of the current agricultural implement.

8. The method of claim 5, wherein the current data is received at regular time intervals from the one or more sensors.

* * * * *